United States Patent [19]

Miyamoto

[11] 4,262,936

[45] Apr. 21, 1981

[54] COLOR DEVELOPING INK CONTAINING ALIPHATIC ESTERS WITH 8-25 CARBON ATOMS

[75] Inventor: Akio Miyamoto, Fujinomiya, Japan

[73] Assignee: Fuji Photo Film Co., Ltd., Minami-ashigara, Japan

[21] Appl. No.: 1,087

[22] Filed: Jan. 5, 1979

[30] Foreign Application Priority Data

Jan. 5, 1978 [JP] Japan .................................... 53-341

[51] Int. Cl.$^3$ ...................... B41M 5/00; C09D 11/02; G03G 9/00

[52] U.S. Cl. .................................... 282/27.5; 106/21; 106/22; 106/26; 106/32; 427/145; 427/150; 427/151; 428/195; 428/207; 428/211; 428/219; 428/914

[58] Field of Search ............................ 106/21, 32, 22; 427/145; 428/195, 207, 211, 219, 914; 282/27.5

[56] References Cited

U.S. PATENT DOCUMENTS

| | | | |
|---|---|---|---|
| 3,129,104 | 4/1964 | Callinan et al. | 106/32 X |
| 3,663,256 | 5/1972 | Miller et al. | 282/27.5 |
| 3,843,383 | 10/1974 | Ishige et al. | 282/27.5 |
| 3,850,649 | 11/1974 | Buerkley et al. | 106/22 X |
| 3,874,895 | 4/1975 | Hayashi et al. | 428/219 X |
| 3,934,070 | 1/1976 | Kimura et al. | 428/343 X |
| 3,957,495 | 5/1976 | Teranishi et al. | 106/32 X |
| 4,012,538 | 3/1977 | Miyamoto et al. | 427/145 |
| 4,022,624 | 5/1977 | Miyamoto et al. | 106/21 X |
| 4,101,690 | 7/1978 | Miyamoto et al. | 106/23 X |
| 4,109,937 | 8/1978 | Gager | 427/145 X |
| 4,137,084 | 1/1979 | Davis et al. | 106/21 |
| 4,155,767 | 5/1979 | Specht et al. | 106/22 |
| 4,173,684 | 11/1979 | Stolfo | 106/21 X |
| 4,199,619 | 4/1980 | Oda et al. | 282/27.5 X |

FOREIGN PATENT DOCUMENTS

| | | | |
|---|---|---|---|
| 51-68037 | 6/1976 | Japan . | |
| 51-0410 | 7/1976 | Japan . | |
| 51-94308 | 8/1976 | Japan . | |
| 1445113 | 8/1976 | United Kingdom | 282/27.5 |

*Primary Examiner*—Howard E. Schain
*Attorney, Agent, or Firm*—Sughrue, Rothwell, Mion, Zinn and Macpeak

[57] ABSTRACT

Color developing ink suitable for pressure-sensitive recording, especially applicable to printing machines utilizing relief and offset printing techniques, which comprises (i) at least one proton-releasing or electron accepting solid acid selected from the group consisting of phenol resins, aromatic carboxylic acids and the metal salts thereof, and (ii) an aliphatic ester containing 8 to 25 carbon atoms, and which has stable printing aptitude and adequate color developing ability, does not swell a rubber roll installed in a printing machine and can provide colored image with excellent light resistance.

15 Claims, No Drawings

COLOR DEVELOPING INK CONTAINING ALIPHATIC ESTERS WITH 8-25 CARBON ATOMS

BACKGROUND OF THE INVENTION

1. Field of the Invention

The present invention relates to color developing ink. In greater detail, the present invention relates to a color developing ink which can produce a colored substance upon reaction with an almost colorless organic compound.

2. Description of the Prior Art

The contact reaction between electron donating or proton accepting colorless organic compounds (hereinafter called "color formers") and electron donating or proton releasing solid acids (hereinafter called "color developers") to produce color developed images has been known for a long time. That reaction has been practically utilized in pressure-sensitive copying sheets as disclosed in, for example, U.S. Pat. Nos. 2,505,470, 2,505,489, 2,550,471, 2,548,366, 2,712,507, 2,730,456, 2,730,457, 3,418,250 and 3,672,935, heat-sensitive recording paper as disclosed in, for example, Japanese Patent Application (OPI) Nos. 4160/68 (The term "OPI" as used herein refers to a "published unexamined Japanese patent application"), 7600/68 and 14039/70, and U.S. Pat. No. 2,939,009 and so on.

Moreover, a printing process in which colored images are obtained by supplying a color former-containing ink to a color developer coated sheet is disclosed in German Patent Application (OLS) No. 1,939,962.

In conventional color developer sheets, a color developer is, in general, coated over the entire surface of the sheet and a desensitizing ink is coated utilizing a printing technique in the areas where images are not desired. As a result, these color developer sheets are very expensive. A color developing ink has been on the market for print coating a color developer only in the areas where images are wanted. However, the use of such an ink has been limited to a flexographic or a gravure printing. These inks contain an organic solvent, such as ethanol or toluol, having low boiling point and for this reason they cannot be used in conjunction with general relief or offset printing machines.

Several types of relief printing color developing inks have been recently reported in Japanese Patent Application (OPI) Nos. 68307/76, 80410/76 and 94308/76. These color developing inks comprise at least one compound selected from a group consisting of phenol resins, aromatic carboxylic acids and the metal salts thereof, isopropylnaphthalene, diphenyl methane, glycols, solvents having a boiling point of 200° C. or more, pigment and the like. However, each of these inks markedly swells the rubber roll of the printing machine or evaporates to dryness on the rubber roll and, as a result, the ink cannot sufficiently exhibit its color developing ability on the surface to be printed, and light resistance of colored images produced is weak and impractical.

SUMMARY OF THE INVENTION

Therefore, an object of the present invention is to provide a color developing ink suitable for use in printing machines utilizing a relief or an offset printing technique, and possessing stable printing aptitude.

Another object of the present invention is to provide a color developing ink which does not swell the rubber roll of a printing machine.

A further object of the present invention is to provide a color developing ink having sufficient color developing ability and capable of producing colored images of strong light resistance.

The above-described objects are attained with a color developing ink which contains at least one compound selected from a group consisting of phenol resins, aromatic carboxylic acids and the metal salts thereof, and aliphatic esters having 8 to 25 carbon atoms.

DETAILED DESCRIPTION OF THE INVENTION

Phenol resins suitable for use in the color developing ink of the present invention are proton releasing type phenol resins generally known to this art. Specifically, they are phenol-formaldehyde copolymers, so-called novolak resins, and phenol-acethylene copolymers. Specific examples of suitable phenol resins are disclosed in U.S. Pat. Nos. 3,455,721, 3,516,845 and 3,649,352.

Examples of these copolymers include p-phenylphenol-formaldehyde copolymer, p-fluorophenol-formaldehyde copolymer, p-chlorophenol-formaldehyde copolymer, p-bromophenol-formaldehyde copolymer, p-iodophenol-formaldehyde copolymer, p-nitrophenol-formaldehyde copolymer, p-carboxyphenol-formaldehyde copolymer, o-carboxyphenol-formaldehyde copolymer, p-alkoxycarbonylphenols-formaldehyde copolymers, p-aroylphenol-formaldehyde copolymer, p-lower alkoxyphenol-formaldehyde copolymers, p-alkyl($C_1$ to $C_{12}$)phenol-formaldehyde copolymer (e.g., p-methylphenol, p-ethylphenol, p-n-propylphenol, p-isopropylphenol, p-n-amylphenol, p-isoamylphenol, p-cyclohexylphenol, p-1,1-dimethyl-n-propylphenol, p-n-hexylphenol, p-isohexylphenol, p-1,1-dimethyl-n-butylphenol, p-1,2-dimethyl-n-butylphenol, p-n-heptylphenol, p-isoheptylphenol, p-5,5-dimethyl-n-amylphenol, p-1,1-dimethyl-n-amylphenol, p-n-octylphenol, p-1,1,3,3-tetramethylbutylphenol, p-isooctylphenol, p-n-nonylphenol, p-isononylphenol, p-1,1,3,3-tetramethylbutylphenol, p-n-decylphenol, p-isodecylphenol, p-n-undecylphenol, p-isoundecylphenol, p-n-dodecylphenol and the like formaldehyde copolymers), copolymers of isomers of the above-described p-alkylphenols with formaldehyde, and copolymers of the mixture of two or more of the above-described alkylphenols and the isomers thereof with formaldehyde. Preferred copolymers are copolymers of a p-substituted phenol wherein the p-substituent is a halogen atom, a phenyl group, an alkyl group, a nitro group, a carboxy group, an alkoxy group, an aroyl group or an alkoxycarbonyl group. More specifically, p-substituents, such as chlorine, a phenyl group and a $C_1$ to $C_{12}$ alkyl group. In addition, the above-described p-substituted phenols may also be substituted as defined above at their m-positions, because they show the behavior similar to those of the p-substituted phenols and the substitution at the m-position does not play an important part therein. Commercially available resins are: p-phenylphenol formaldehyde resin (CKM-5254 Showa Union Co.) and p-tert-butylphenol acetylene resin (ROCSOL, Fine Dyestuffs and Chemicals, Ltd.).

Specific examples of aromatic carboxylic acids which can be employed in the color developing ink of the present invention include benzoic acid, o-, m- and p-chlorobenzoic acids, o-, m- and p-nitrobenzoic acids, o-, m- and p-toluic acids, 4-methyl-3-nitrobenzoic acid, 2-chloro-4-nitrobenzoic acid, 2,3-dichlorobenzoic acid, 2,4-dichlorobenzoic acid, p-isopropylbenzoic acid, 2,5-dinitrobenzoic acid, p-tert-butylbenzoic acid, N-phenylanthranilic acid, 4-methyl-3-nitrobenzoic acid, salicylic acid, m-hydroxybenzoic acid, p-hydroxybenzoic acid, 3,5-dinitrosalicylic acid, 5-tert-butylsalicylic acid, 3-phenylsalicylic acid, 3-methyl-5-tert-butylsalicylic acid, 3,5-di-tert-butylsalicylic acid, 3,5-di-tert-amylsalicylic acid, 3-cyclohexylsalicylic acid, 5-cyclohexylsalicylic acid, 3-methyl-5-isoamylsalicylic acid, 5-isoamylsalicylic acid, 3,5-di-sec-butylsalicylic acid, 5-nonylsalicylic acid, 2-hydroxy-3-methylbenzoic acid, 2-hydroxy-5-tert-butylbenzoic acid, 2,4-cresotinic acid, 5,5-methylenedisalicylic acid, acetoaminobenzoic acid (o, m and p), 2,4-dihydroxybenzoic acid, 2,5-dihydroxybenzoic acid, anacardic acid, 1-naphthoic acid, 3,5-di-α,α-dimethylbenzylsalicylic acid, 3,5-di-α-methylbenzylsalicylic acid, 2-naphthoic acid, 1-hydroxy-2-naphthoic acid, 2-hydroxy-3-naphthoic acid, 2-hydroxy-1-naphthoic acid, thiosalicylic acid, 2-carboxybenzaldehyde and the like. Aromatic carboxylic acids also suitable for use in the present invention are disclosed in U.S. Pat. No. 3,934,070.

Of these aromatic carboxylic acids, the hydroxyl group-containing acids are particularly effective.

Examples of metals forming the metal salts of phenol resins or aromatic carboxylic acids employable in the color developing ink of the present invention include zinc, copper, lead, magnesium, calcium, tin, nickel, aluminum. Most effective among these are zinc and aluminum.

Esters which may be employed in the color developing ink in the present invention contain 8 to 25 carbon atoms and are prepared from aliphatic alcohols having 5 to 20 carbon atoms (e.g., 1,3-dimethylbutyl alcohol, 2-ethylbutyl alcohol, 2-ethylhexyl alcohol, amyl alcohol, n-butyl alcohol, and most preferably 2,2,4-trimethyl-1,3-pentanediol, 2,2-dimethyl-1,3-pentanediol, 2,4-dimethyl-2,4-pentanediol, 2,2-dimethyl-1,3-butanediol, 2-methyl-2,4-pentanediol, 2,3,3,4-tetramethyl-2,4-pentanediol, stearyl alcohol) and aliphatic monocarboxylic acids having 2 to 10 carbon atoms (e.g., acetic acid, propionic acid, butyric acid, lactic acid) in an esterification reaction. The resulting synthesized esters include those which contain hydroxyl groups, carbonyl groups, carboxyl groups, halogens, double bonds and/or cyclohexyl groups.

Specific examples of such esters include methylamyl acetate (1,3-dimethylbutyl acetate), 2-ethylbutyl acetate, 2-ethylhexyl acetate, amyl propionate, n-butyl butyrate, i-butyl-i-butyrate, 2,2,4-trimethyl-1,3-pentanediol monoisobutyrate, 2,2,4-trimethyl-1,3-pentanediol diisobutyrate, 2,2-dimethyl-1,3-pentanediol diisobutyrate, 2,4-dimethyl-2,4-pentanediol diacetate, 2,2-dimethyl-1,3-butanediol diisobutyrate, 2-methyl-2,4-pentanediol dipropionate, 2,3,3,4-tetramethyl,2,4-pentanediol monoacetate, amyl lactate and stearyl lactate.

Particularly preferable esters are those which are prepared from diols having 6 to 12 carbon atoms (e.g., see the above pentanediols and butanediols). Further, those which have a solubility in water of 2 g/100 g $H_2O$ or less at 20° C. and, preferably 0.8 or less are desirable.

A preferred amount of the phenol resin, the aromatic carboxylic acid or the metal salt thereof in the ink ranges from about 10 to 70 wt% and, preferably from about 30 to 60 wt%. A preferred amount of the ester in the ink of the present invention ranges from about 10 to 70 wt% and, preferably from about 20 to 60 wt%.

The color developing ink of the present invention can obtain the objects described before if it only contains the phenol resin, the aromatic carboxylic acid or the metal salt thereof, and the ester containing 8 to 25 carbon atoms, but the addition of materials in addition to the above-described compounds generally used in relief printing or offset inks may be made to the present ink composition. For example, mention may be made of those materials which are described in E. A. Apps, *Printing Ink Technology,* Chapters 2–9, Leonard Hill, London (1961). Specifically, a binder such as a ketone resin, a polyamide resin, a maleic acid resin, a rosin denatured phenol resin, an epoxy resin, a rosin ester, a petroleum resin, a urethane resin, an alkyd resin or the like. These resins may be contained in the ink composition in a concentration of about 0 to 40% and preferably about 0 to 25%. Inorganic materials such as titanium dioxide, barium sulfate, calcium carbonate, talc, kaolin, acid clay, bentonite, organic bentonite, zinc oxide, aluminium hydroxide and/or the like can also be used and contained in the ink in a concentration of about 0 to 40% and preferably about 0 to 30%. The ink composition of the present invention can also contain a drying oil or a semi-drying oil such as linseed oil, tung oil, soybean oil, fish oil, synthetic drying oil or the like in a concentration of about 0 to 50% and preferably 0 to 20%. The ink composition may contain a petroleum fraction such as kerosene, machine oil, ink oil or the like. The petroleum fraction is used in order to improve the printing aptitude, a color developing ability on the coating surface to be printed and the light resistance of colored images. Specifically, it is preferable to use a fraction of 240° C. to 315° C. The petroleum fraction may be contained in the ink in a concentration of about 0 to about 70%, preferably 10 to 60%. Waxes such as paraffin wax, microcrystalline wax, carnauba wax and the like may be contained in the ink in a concentration of about 0 to 80% and preferably about 0 to 5%. A set-off inhibitor such as starch, dextrin or the like may be contained in the ink in a concentration of about 0 to 10% and preferably about 0 to 5%.

In addition, photohardening type color developing inks can be prepared by the introduction of light-sensitive resins such as prepolymers of light-sensitive acrylic acid derivatives, polyfunctional acryl monomers and the like into the color developing ink.

The color developing ink of the present invention can be easily prepared by one skilled in the art by mixing, dissolving and optionally kneading using a three roller mill or the like the above-described components.

A coating amount of the color developing ink of the present invention ranges from about 0.2 $g/m^2$ to 8.0 $g/m^2$ and preferably from about 0.5 $g/m^2$ to 3.0 $g/m^2$.

Color formers to which the color developing ink of the present invention can be used in conjunction with are not restricted, but mention may be made of basic colorless dyes as hereinafter described as representative examples of specific color formers.

Examples of basic colorless dyes include triarylmethane series compounds such as 3,3-bis(p-dimethylaminophenyl)-6-dimethylaminophthalide (i.e., Crystal Violet lactone), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis(1,2-dimethylindole-3-yl)-5-dimethylaminophthalide, 3,3-bis(1,2-dimethylindole-3-yl)-6-dimethylaminophthalide, 3,3-bis(9-ethylcarbazole-3-yl)-5-dimethylaminophthalide, 3,3-bis(2-phenylindole-3-yl)-5-dimethylaminophthalide, 3-p-dimethylaminophenyl-3-(1-methylpyrrole-2-yl)-6-dimethylaminophthalide and the like; diphenylmethane series compounds such as 4,4'-bis-dimethylaminobenzohydrin benzyl ether, N-halophenyl-leuco-auramine, N-2,4,5-trichlorophenyl-leucoauramine and the like; xanthene series compounds such as Rhodamine B-anilinolactam, Rhodamine B-p-nitroanilinolactam, Rhodamine B-p-chloroanilinolactam, 3-dimethylamino-7-methoxyfluorane, 3-diethylamino-7-methoxyfluorane, 3-diethylamino-6-methoxyfluorane, 3-diethylamino-7-chlorofluorane, 3-diethylamino-7-chloro-6-methylfluorane, 3-diethylamino-6,8-dimethylfluorane, 3-diethylamino-7-acetylmethylaminofluorane, 3-diethylamino-7-methylaminofluorane, 3,7-diethylaminofluorane, 3-diethylamino-7-dibenzylaminofluorane, 3-diethylamino-7-methylbenzylaminofluorane, 3-diethylamino-7-phenylamino-3-methylfluorane, 3-diethylamino-7-chloroethylmethylaminofluorane, 3-diethylamino-7-dichloroaminofluorane and the like; thiazine series compounds such as benzoyl-leuco-methylene blue, p-nitrobenzyl-leuco-methylene blue and the like; spiro compounds such as 3-methyl-spiro-dinaphthopirane, 3-ethyl-spiro-dinaphthopirane, 3,3'-dichloro-spiro-dinaphthopirane, 3-benzyl-spiro-dinaphthopirane, 3-methyl-(3-methoxybenzo)-spiropirane, 3-propyl-spiro-dibenzopirane and the like; and the mixtures thereof.

The color formers may be dissolved in a solvent and encapsulated, or may be dispersed in a binder solution and then coated on a support.

As such a solvent, natural or synthetic oils can be used individually or in a combination. Specific examples of the solvents include cotton seed oil, kerosene, paraffin, naphthene oil, alkylated biphenyl, alkylated terphenyl, chlorinated paraffin, alkylated naphthalene and the like. As examples of methods of encapsulating, mention may be made of microencapsulation using coacervation of a hydrophilic colloid sol as disclosed in U.S. Pat. Nos. 2,800,457 and 2,800,458; microencapsulation utilizing an interfacial polymerization process as disclosed in British Pat. Nos. 867,797, 950,443, 989,264 and 1,091,076; and like processes.

The color developing inks of the present invention were tested using the following color former sheet.

Preparation of Color Former Sheet A 10 parts of acid treated gelatin having an isoelectric point of 8.0 and 10 parts of gum arabic were dissolved in 60 parts of water at 40° C. 0.2 part of sodium alkylbenzene sulfonate was added as an emulsifier to the resulting solution. Then, 50 parts of a color former oil having the following composition was added to the solution and emulsified.

| Composition of the Color Former Oil | |
|---|---|
| Diisopropylbiphenyl | 4 parts |
| Kerosene | 1 part |
| Crystal Violet Lactone | 2.5 wt % |
| Benzoyl Leuco Methylene Blue | 2.0 wt % |

When the average drop size of emulsified drops became 8 microns, emulsification was suppressed by the addition of 100 parts of 40° C. water.

Further, 210 parts of 30° C. water was added thereto with stirring and then 20% of hydrochloric acid was added dropwise to adjust the pH to 4.4. The stirring was continued and the solution was cooled to 8° C. To the cooled solution, 1.5 parts of 20% glutaraldehyde was added.

Furthermore, 30 parts of a 10% carboxymethyl starch solution was added, and a 25% aqueous solution of sodium hydroxide was added to adjust the pH to 8.5. Then, the temperature of the solution was elevated to 30° C. to produce microcapsules having hardened wall films.

10 parts of cellulose flock was dispersed into the resulting microcapsule-containing solution. The resulting mixture was applied to paper having a weight of 40 $g/m^2$ at a coverage (on a solids basis) of 6 $g/m^2$ to prepare color former sheet A.

The present invention will now be illustrated in greater detail by the following Examples and Comparative Examples. These Examples are not to be construed as limiting the scope of the present invention. In the Examples, mixing and compounding proportions are in parts by weight.

EXAMPLE 1

50 parts of 2,2,4-trimethyl-1,3-pentanediol diisobutyrate and 50 parts of zinc 3,5-di-α-methylbenzylsalicylate were heated at 160° C. to dissolve them in one another. Thus, a color developing ink was obtained. This ink was print-coated on high quality paper in a coating amount of 1.7 $g/m^2$ using a relief printing machine.

EXAMPLE 2

40 parts of 2-methyl-2,4-pentanediol dipropionate and 30 parts of paraphenylphenol-formaldehyde resin (CKM-5254, trade name of Showa Union Co.) were dissolved by heating them to 160° C. To the resulting solution, 50 parts of titanium oxide and 10 parts of ink solvent (Solvent No. 5, boiling point 276°-311° C., trade name of Nippon Petrochemicals Co., Ltd.) were added, and kneaded with a three roller mill to produce a color developing ink. The thus-obtained ink was applied in a coating amount of 1.7 $g/m^2$ to high quality paper using an offset printing machine.

EXAMPLE 3

20 parts of isobutylisobutyrate, 20 parts of 2,2-dimethyl-1,3-butanediol dipropionate, 30 parts of 3,5-di-tert-butylsalicylic acid and 7 parts of ester resin (Ester Gum AA-L having a softening point of 82° C., trade name of Arakawa Kagaku K.K.) were dissolved by heating them to 160° C. To the dissolved matter, 10 parts of zinc oxide and 10 parts of 2,2-dimethyl-1,3-butanediol dipropionate were added and kneaded homogeneously using a three roller mill to produce a color developing ink. The thus-obtained ink was applied in a coating amount of 1.7 $g/m^2$ to a high quality paper using a relief printing machine.

COMPARATIVE EXAMPLE 1

Print-coated paper was obtained in the same manner as in Example 1 except that methylphenylxylylmethane was used instead of 2,2,4-trimethyl-1,3-pentanediol diisobutyrate in the same amount.

COMPARATIVE EXAMPLE 2

Print-coated paper was obtained in the same manner as in Example 3 except that 40 parts of diisopropylnaphthalene was used instead of the mixture of isobutylisobutyrate and 2,2-dimethyl-1,3-butanediol dipropionate.

COMPARATIVE EXAMPLE 3

In Example 2, instead of 2-methyl-2,4-pentanediol dipropionate the same amount of ink solvent (Solvent No. 5, boiling point 276°-311° C., trade name of Nippon Petrochemicals Co., Ltd.) was used and heated to 160° C., but paraphenylphenolformaldehyde resin could not be dissolved therein. Therefore, the resulting mixture could not be used as a printing ink.

The characteristics of the color developing inks obtained in the Examples and the Comparative Examples at the time of printing were examined. Also, the density and the light resistance of copied images obtained by allowing each of color developer print-coated papers and the color former sheet A to come into face-to-face contact with each other and then, by writing some images thereon using a ball-point pen were investigated by comparison with the Comparative Examples. Light resistance was observed after exposure of the copied image to sunlight for 2 hours. The results obtained are set forth in Table 1.

TABLE 1

| | Property of Protecting Rubber Roller of Printing Machine from Swelling | Density | Light Resistance |
|---|---|---|---|
| Example 1 | A | A | A |
| Example 2 | A | B | B |
| Example 3 | A | B | B |
| Comparative Example 1 | D | C | C |
| Comparative Example 2 | D | C | C |

A: Excellent,
B: No trouble in practical use,
C: Some trouble in practical use,
D: Improper for practical use While the invention has been described in detail and with reference to specific embodiments thereof, it will be apparent to one skilled in the art that various changes and modifications can be made therein without departing from the spirit and scope thereof.

What is claimed is:

1. A relief or offset printing color developing ink for pressure-sensitive recording which comprises: (i) at least one compound selected from a group consisting of aromatic carboxylic acids and the metal salts thereof, and (ii) an aliphatic ester having 8 to 25 carbon atoms, wherein said ester is the condensation product of a $C_5$–$C_{20}$ aliphatic alcohol and a $C_2$–$C_{10}$ aliphatic monocarboxylic acid.

2. The color developing ink of claim 1, wherein said aromatic carboxylic acid is a benzoic acid or a derivative thereof.

3. The color developing ink of claim 2, wherein said benzoic acid is substituted with a hydroxyl group.

4. The color developing ink of claim 1, wherein said ester is selected from the group consisting of 2,2,4-trimethyl-1,3-pentanediol monoisobutyrate, 2,2,4-trimethyl-1,3-pentanediol diisobutyrate, 2,2-dimethyl-1,3-pentanediol diisobutyrate, 2,4-dimethyl-2,4-pentanediol diacetate, 2,2-dimethyl-1,3-butanediol diisobutyrate, 2-methyl-2,4-pentanediol dipropionate and 2,3,3,4-tetramethyl-2,4-pentanediol monoacetate.

5. The color developing ink of claim 1, wherein said alcohol is a $C_6$–$C_{12}$ diol.

6. The color developing ink of claim 5, wherein said ester has a solubility in water of 2 g/100 g $H_2O$ or less at 20° C.

7. The color developing ink of claim 1, wherein said said aromatic carboxylic acid or metal salt thereof is present in an amount of about 10 to 70 weight %.

8. The color developing ink of claim 7, wherein said ester is present in an amount of 10 to 70 weight %.

9. A color developer sheet comprising a support having coated thereon the color developing ink of claim 1.

10. The color developer sheet of claim 9, wherein said ink is coated in an amount of 0.2 g/$m^2$ to 8.0 g/$m^2$.

11. The color developing ink of claim 1, wherein said aromatic carboxylic acid is naphthoic acid or a derivative thereof.

12. The color developing ink of claim 1, wherein said ink contains a petroleum fraction of 240° C. to 315° C.

13. The color developer sheet of claim 9, wherein said sheet is printed and coated utilizing a relief or an offset printing technique.

14. The color developing ink of claim 1, which is free of a binder.

15. The color developing ink of claim 1, wherein said color developing ink is reacted in conjunction with a substantially colorless organic compound to provide a colored reaction product.

* * * * *